US007143360B1

(12) United States Patent
Ogami et al.

(10) Patent No.: US 7,143,360 B1
(45) Date of Patent: Nov. 28, 2006

(54) PIN-OUT CONNECTIONS/DRIVE LEVELS DIRECT-SET BY DROP DOWN LIST

(75) Inventors: Kenneth Y. Ogami, Bothell, WA (US); Douglas H. Anderson, Edmund, WA (US)

(73) Assignee: Cypress Semiconductor Corporation, San Jose, CA (US)

(*) Notice: Subject to any disclaimer, the term of this patent is extended or adjusted under 35 U.S.C. 154(b) by 507 days.

(21) Appl. No.: 10/032,986

(22) Filed: Oct. 29, 2001

(51) Int. Cl.
*G06F 3/00* (2006.01)
(52) U.S. Cl. .................................. 715/763; 715/967
(58) Field of Classification Search .............. 345/735, 345/808, 810, 840, 843, 841, 771; 715/502, 715/503, 763, 967
See application file for complete search history.

(56) References Cited

U.S. PATENT DOCUMENTS

| 4,942,540 | A | * | 7/1990 | Black et al. ................. 709/228 |
| 5,394,522 | A | * | 2/1995 | Sanchez-Frank et al. ... 345/735 |
| 6,246,410 | B1 | * | 6/2001 | Bergeron et al. ........... 345/854 |
| 6,366,300 | B1 | * | 4/2002 | Ohara et al. ................. 345/771 |
| 6,750,889 | B1 | * | 6/2004 | Livingston .................. 345/833 |

* cited by examiner

*Primary Examiner*—Kieu D. Vu

(57) ABSTRACT

Embodiments of the present invention relate to a method and mechanism for configuring input/output connections in a programmable logical device, which comprise presenting a graphical user interface enabled to aid in configuring the programmable logical device, selecting a configuration presentation from the graphical user interface, selecting an I/O pin to be configured from the configuration presentation and selecting options for configuring the pin from among those presented in a selection set presented by the graphical user interface. The pins to be configured can be selected from either a graphical presentation or a parameter table and option selection sets can be presented in pop-up windows or drop-down lists.

33 Claims, 6 Drawing Sheets

PIN-OUT CONNECTIONS/DRIVE LEVELS DIRECT-SET BY DROP DOWN LIST

FIELD OF THE INVENTION

Embodiments of the present invention relate to the field of configuring and programming highly complex programmable logical devices.

BACKGROUND OF THE INVENTION

Application-specific integrated circuits (ASICs), have been supplanted more and more by integrated circuits (ICs) that can be programmed to fulfill multiple functions. There are now many various programmable logic architectures, including, for example, programmable logic devices ("PLDs"), programmable logic arrays ("PLAs"), complex programmable logic devices ("CPLDs"), field programmable gate arrays ("FPGAs") and programmable array logic ("PALs"). Although there are differences between these various architectures, each of the architectures typically includes a set of input conductors coupled as inputs to an array of logic gates (e.g., a product term array made up of logical AND gates), the outputs of which, in turn, act as inputs to another portion of the logic device. Complex Programmable Logic Devices ("CPLDs") are large scale PLDs that, like all programmable architectures, are configured to the specific requirements of an application by programming.

Each of these architectures, originally programmed once for a specific function which would be a device's only function for its lifetime, has begun to be implemented in a reprogrammable form. A programmable logic device can now be re-programmed in operation and can fulfill the functions of many different devices.

The complexity of a programmable device requires complex programming of each of its configurations which can be stored. Each stored configuration reprogramming can be accomplished "on the fly" by applying the stored configuration to the device.

Initial programming of a highly complex device, though, can be tedious and time consuming. Numerous tools have been developed to aid the programmer in forming each configuration necessary to each device. However, even with current configuration tools, a programmer must track innumerable lines of programming and device characteristics in order to properly establish a complex device configuration. Most particularly, the configuration of a device's input/output pins which have different characteristics with every different device configuration requires meticulous attention to detail. Moreover, these pin characteristics, crucial for proper device operation, must relate properly to the device configuration and to external circuitry. Currently, the programming tool sophistication requires a very burdensome level of expertise on the part of the programmer and an enormous number of manual, error-prone and tedious to be done which can limit the market of users of these complex programmable devices.

A need exists, therefore, for a method for programming highly complex programmable devices, particularly for configuring I/O pins differently for each programmed device configuration. Furthermore, such a method must be much more user-friendly than currently available, enabling a user of normal skills to configure enormously complex programmable devices with multiple configurations.

SUMMARY OF THE INVENTION

Disclosed herein is a method for programming highly complex programmable devices, and particularly for configuring input/output (I/O) pins to accommodate different programmed device configurations. The method is much more user-friendly than currently available, enabling a user of normal skills to configure enormously complex programmable devices with multiple configurations.

Embodiments of the present invention relate to a method and mechanism for configuring input/output connections in a programmable logical device, which comprise presenting a graphical user interface enabled to aid in configuring the programmable logical device, selecting a configuration presentation from the graphical user interface, selecting an I/O pin to be configured from the configuration presentation and selecting options for configuring the pin from among those presented in a selection set presented by the graphical user interface. The pins to be configured can be selected from either a graphical presentation or a parameter table and option selection sets can be presented in pop-up windows or drop-down lists.

These and other objects and advantages of the present invention will become obvious to those of ordinary skill in the art after having read the following detailed description of the preferred embodiments which are illustrated in the various drawing figures.

BRIEF DESCRIPTION OF THE DRAWINGS

The operation and components of this invention can be best visualized by reference to the drawings.

DETAILED DESCRIPTION

Figure 1:
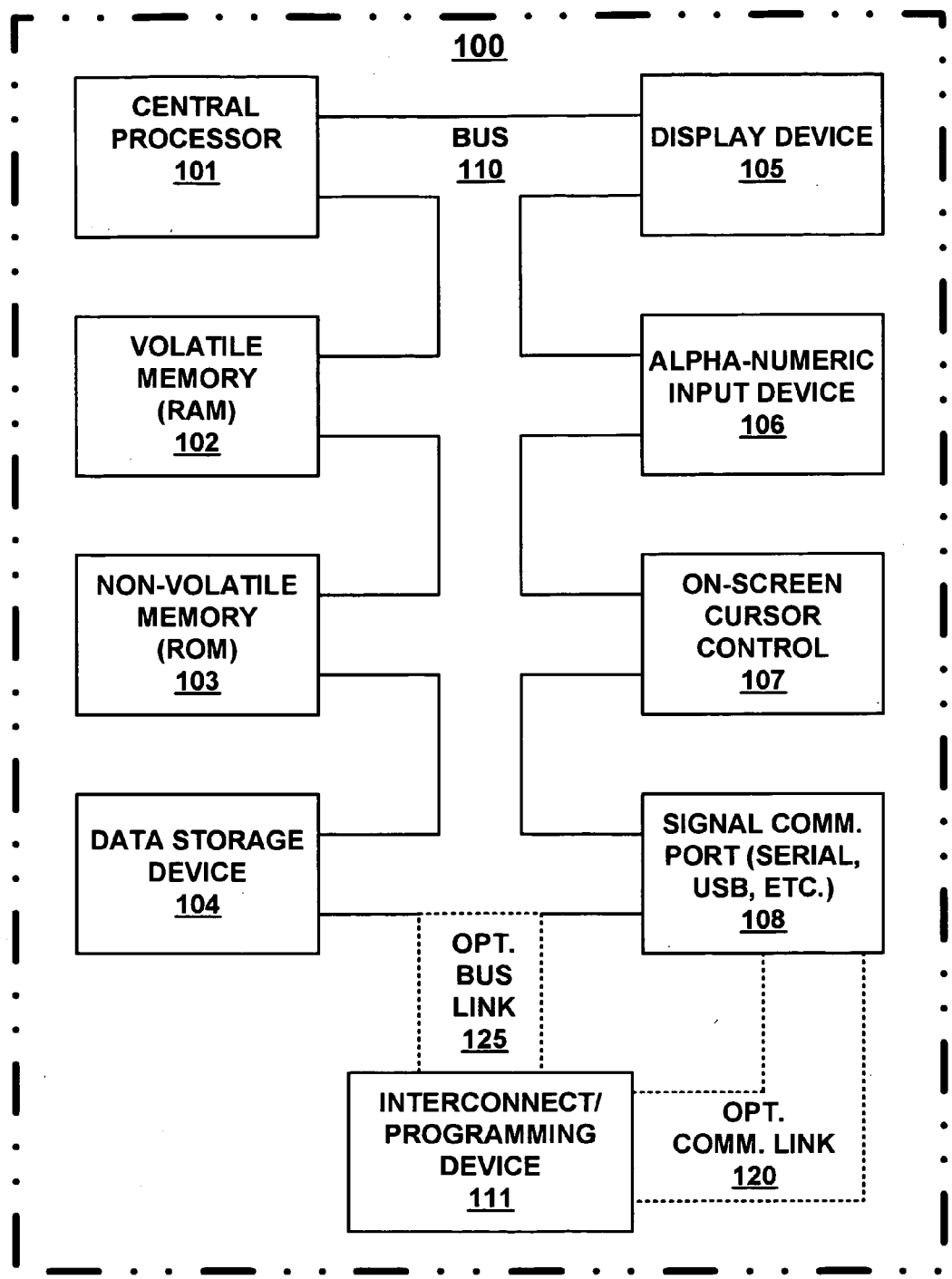
FIG. 1 illustrates a generic computer such as would be used in accordance with one embodiment of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention. At times, concepts disclosed in this discussion of embodiments of the present invention will be made more readily apparent be reference to the Figures.

The configuration of programmable devices has been difficult from the inception of such devices. Multifunction input/output (I/O) pins, especially, have been very difficult to configure in the past. I/O pins are the connection of a device to its environment, the outside electronic world. Typically, I/O pins had multiple registers that needed to be programmed to configure the pin type as well as drive characteristics for each I/O pin. These registers are often tedious to manually program and debug. Horror stories abound of weeks wasted programming and debugging the I/O pin configuration for a single design using a conventional system.

The particular embodiment of the present invention discussed here employs a portion of a graphical user interface (GUI) to facilitate the configuration of I/O pins in a microcontroller software design tool. Note that a microcontroller is one of many different possible configurations for a programmable device and for some other programmable logic devices. Other configurations and, indeed, other types of programmable devices could benefit equally from use of the concepts employed in this embodiment. It should also be noted that the GUI employed in this embodiment is one developed specifically for configuring programmable microcontrollers, but other GUIs could also incorporate this embodiment of the present invention.

The GUI referred to in this discussion of this embodiment of the present invention presents a number of window frames that contain various computer-aided design tools. One of these tools of specific interest to this discussion of this embodiment of the present invention is the I/O pin configuration tool. While actual programming of the device and the I/O pins takes place elsewhere, the GUI provides the user-friendliness and detail management necessary to an efficient programming operation.

An embodiment of the present invention discussed here may be implemented in a computer similar to the generic computer illustrated in FIG. 1. FIG. 1 illustrates, in block diagram, a configuration typical to a computer system. There, computer system 100 comprises bus 110 which electronically connects central processor 101, volatile RAM 102, non-volatile ROM 103 and data storage device 104.

Important to a concept involving a graphical user interface, display device 105 is also connected to the bus. Similarly connected are alpha-numeric input device 106, cursor control 107, and signal I/O device 108. Signal I/O device 108 could be implemented as a serial connection, USB, an infrared transceiver or an RF transceiver. The configuration of the devices to which this embodiment of the present invention applies may vary, depending on the specific tasks undertaken. In every case, however, display device 105 and cursor control 107 would be implemented in one form or other. It is highly probable that some implementation of interconnect/programming device 111 would also be connected to computer bus 110, whether directly by bus link 125 or indirectly by signal communication 108 and communication link 120. The purpose of device 111 would be to actually implement the configurations developed using embodiments of the present invention. It is also possible that interconnect/programming device 111 could be a part of the circuitry suite permanently connected to the environment of the targeted device.

The embodiment of the present invention discussed herein features the use of a graphical information window in a GUI presented in a graphic display. The term "graphical information," as used in this discussion, may include both icons and text. While the particular portion of the graphic display envisioned as the pin configuration window is, in this embodiment, a particular area in the overall graphic display, other embodiments could use a different area of the display.

An important enablement of a GUI is the ability to accept commands related to graphic information in the display. Such commands are generally input by "mouse-click." A mouse-click refers to any selection method that involves deliberate action on the part of the user specifically related to the position of a cursor in the GUI display, usually involving the user depressing a button on a cursor control mouse. A mouse click can also be implemented by any other means related to cursor control including cursor control by keyboard buttons.

Figure 2:
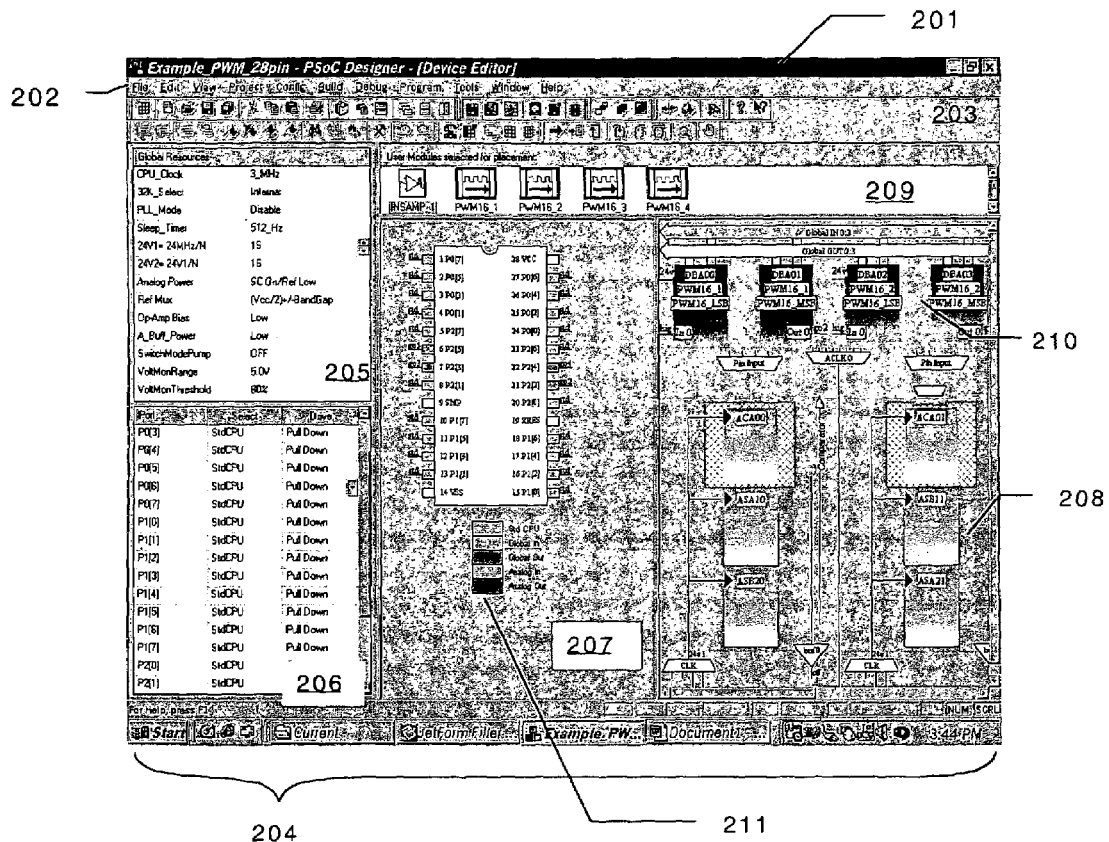
FIG. 2 illustrates an exemplary screen shot of a graphical user interface (GUI) in accordance with one embodiment of the present invention.

One possible implementation of a GUI as referred to in this discussion of this embodiment of the present invention is illustrated as an exemplary screen shot of a display in FIG. 2. There, the GUI is configured for a specific operating system or OS. While such an existing operating system is quite common, this discussion in no way should be taken as to imply that use of the above operating system is integral to the concepts presented herein. Any other operating system capable of presenting a graphical user interface is equally capable of implementing similar embodiments. It is even conceivable that some implementation of an embodiment of the present invention could be employed on a personal data assistant or some other handheld device.

The display shown in FIG. 2 comprises a number of sub-windows or frames within the graphical information area. Included in the display, and commonly associated with any display in operating system, are title bar 201 which often encompasses the entire top edge of a display, menu bar 202, tool bar 203 and task bar 204. These elements of a display are specific to an implemented GUI in the OS shown. A GUI presented in another operating system could present different displays and subframes but the concepts presented in this embodiment of the present invention would still be involved.

The portions of the display or GUI in FIG. 2 that are specific to this embodiment of the present invention are global resource table 205, pin parameter table 206, pin-out diagram 207, and the device configuration aids of sub-windows 208, 209 and 210. These and similar sub-windows are likely to be associated with this embodiment or others that employ a GUI to aid the configuration of any programmable logic device.

It must be noted here that the names associated with the indicated tables, windows, icons and displays are given as an indicator of the associated functions. The names are not intended to limit the functionality of any portion of any of the presented illustrations nor are any of the various elements of a GUI expected to be limited to or by any particular naming. Furthermore, the illustrated arrangement of windows in the GUI and of elements in each window are not intended to limit possible display design, arrangements, colors, shapes, patterns or any other graphic constituent to any particular item. It is the concepts presented in this embodiment of the present invention that are intended to be discussed and described here.

Figure 3:
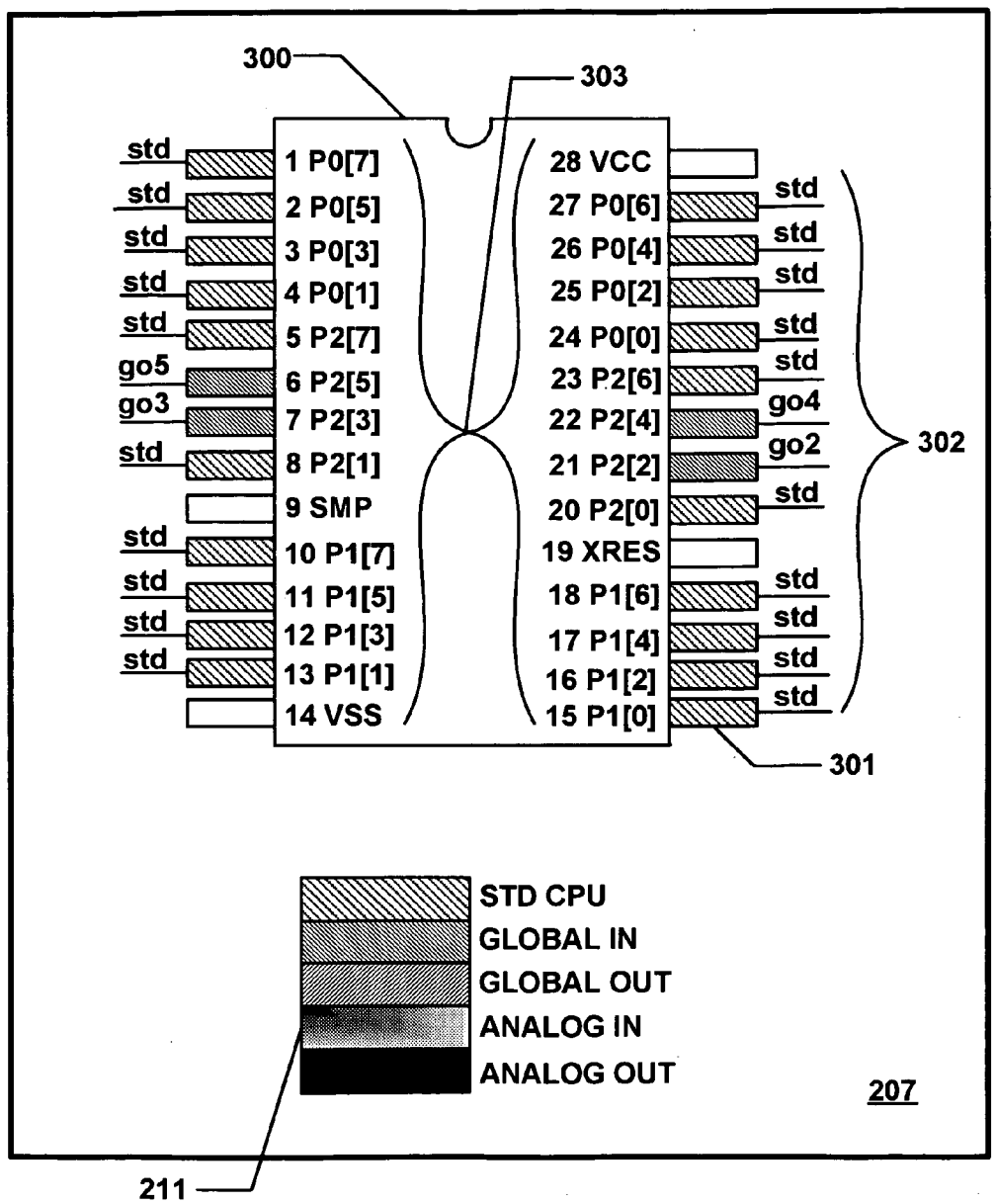
FIG. 3 illustrates a pin-out window from a graphical user interface (GUI) in accordance with one embodiment of the present invention.
Figure 4:
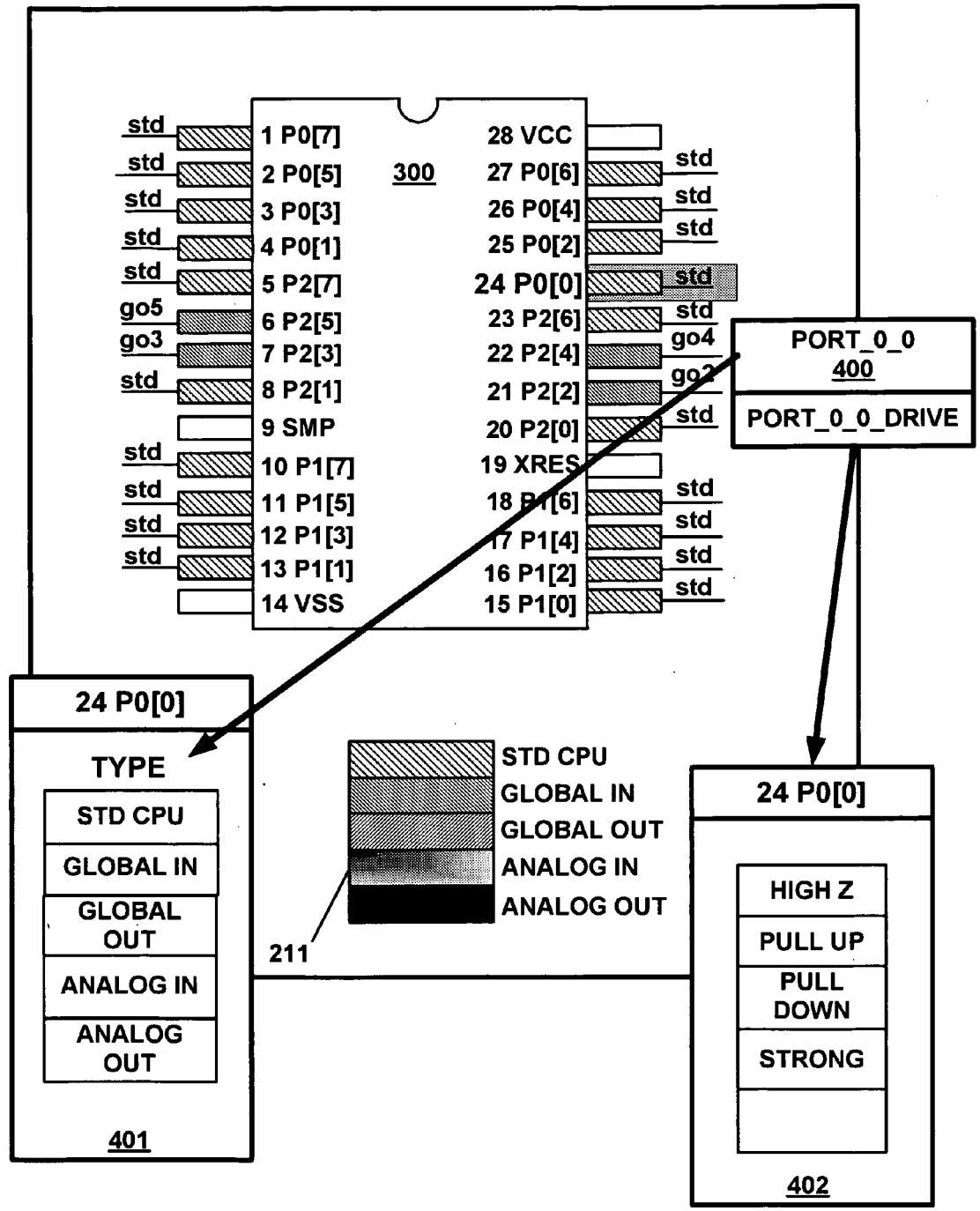
FIG. 4 illustrates another view of a pin-out window from a graphical user interface (GUI) in accordance with one embodiment of the present invention.
Figure 5:
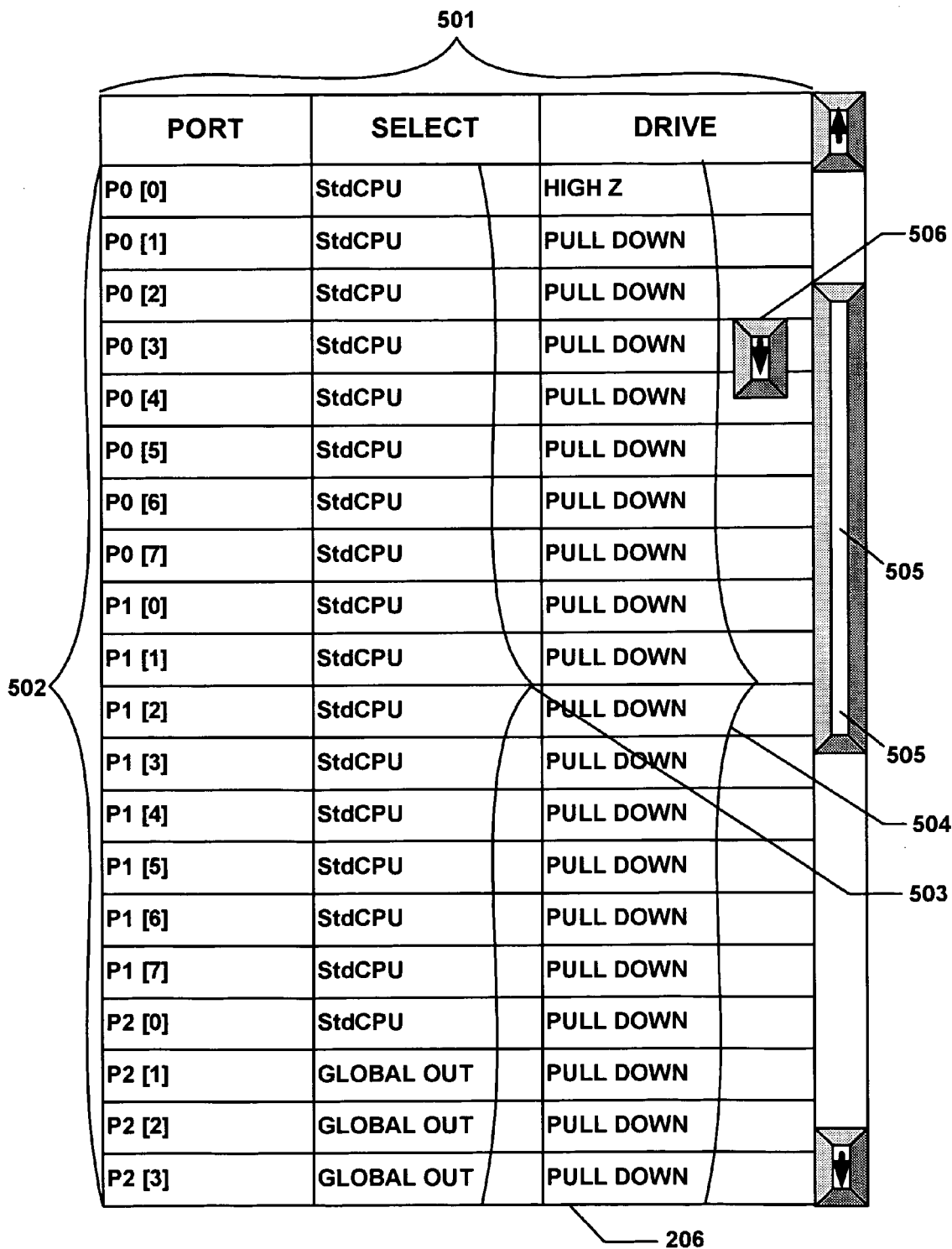
FIG. 5 illustrates a pin parameter selection table window from a graphical user interface (GUI) in accordance with one embodiment of the present invention.

FIGS. 3, 4 and 5 are detailed illustrations of parts of the overall display shown in FIG. 2. The display shown in FIG. 2 is specific to the portions of device programming that would involve I/O pin configuration. FIG. 3 is an illustration of pin-out window 207 which includes pin diagram 300 and legend 211 which could be a color-code assignment to pin type. Legend 211 might also be implemented as a popup window. Pin diagram 300 is intended to give the user a graphic illustration of the device being programmed and, in this pin configuration oriented display, it is the I/O pins that occupy user's attention. Note that pin diagram 300 is illustrative of a DIP (dual inline pin) configured IC package. This particular illustration is just that, an illustration. The graphic is not intended to be used solely with DIP-configured ICs and is expected to be adaptable to many other package configurations. The DIP graphic, however, is well suited to presenting the user the necessary information and to accept the necessary user input to properly configure the I/O pins of a programmable device.

A specific advantage of a GUI is the capability to accept input at a point in a display where the input has the most meaning. Hence, the graphically presented pin status array 302 is oriented to both present pin-specific information and to accept input specific to each pin. The status of each pin labeled in callout array 303 is illustrated in status array 302. The status array 302 includes the present pin type in this implementation. If the user moves the cursor to the pin graphic and mouse-clicks it, a selection window, such as the example in FIG. 4, can be shown that leads to further pin type and drive type selection options, providing an input point to accept changes in those pin characteristics.

Pin characteristics that are selectable through a pop-up window, as at 401 and 402, could include pin type such as analog input, analog output, global bus, or others and drive type such as high Z, pull-up, pull-down, strong, etc. The pop-up window could include a selectable list which could be tailored to each pin. For example, pin 28 in pin diagram 300 could be selected but, because it is hard-configured as the Vcc pin, no selectable items would appear in the pop-up window. Pin 27, however, is implemented here as port 0[6] and is one member of an array of configurable pins in the particular device addressed in this embodiment. As such, the pop-up window that would appear when the pin graphic were clicked could trigger an entire list of available selectable options.

FIG. 4 is an illustration of one possible version of a popup window that could appear during use of this embodiment of the present invention. Window 400 might appear when a pin icon in pin diagram 207 is picked. In the example shown, pin 24, implemented as P0[0] has been selected and subsequently highlighted by the GUI. At that point popup window 400 has appeared and presented a selection option related to the selected pin, offering either a port type selection at "Port_0_0" or a drive type selection at "Port_0_0_Drive". If, continuing the example, port type were selected, type option window 401 could pop up the available options for port type. If port drive type were selected, popup window 402 would appear, offering the selection set appropriate to that option. In either case, the drop down list highlights the current configuration setting for the selected pin. This would enable the user seeing the setting since the window could obscure the information adjacent to the pin in pin diagram 300. Note that the actual labels in the illustration as well as the order of appearance of the popup windows are for illustrative purposes only and do not limit what may be included in the popup window. Note, too, that popup windows 400, 401 and 402 could also be called drop-down lists.

FIG. 5 is an enlarged illustration of pin parameter table 206. Table 206 appears in the device configuration display discussed in FIG. 2 and presents an alternative drop-down list method of configuring the device pins. Under title bar 501 are located port number list 502, type selection list 503 and drive type list 504, respectively. The pin type selection list 503 and the drive type list 504 show the current settings for the associated pin when the drop-down list is not shown. On the right is scroll bar 505 which allows access to all the listed ports of a device being configured. When an item is selected, if there are additional options for the item, an icon such as drop-down button 506 can appear. In this example of a possible embodiment of the present invention in which drive type for port 0[3] is selected, picking drop-down button 506 would allow the appearance of a drop-down list containing drive type options such as was seen in popup window 402 in FIG. 4.

An alternative drive type could be selected from the drop-down list. If port type had been selected in the column headed by the word "Select", then a drop down button could appear in that window and, when it was picked, a drop-down list similar to window 401 could appear, offering the port type selection set. Pin parameter table 206 is presented in the user parameter table of the device configuration display illustrated in FIG. 2. It offers an alternative method of device pin configuration and characterization. Note, again, that the labels and graphical content of the illustrated displays are intended for illustration and are not intended to limit the concepts presented in this discussion of this embodiment of the present invention to any particular fixed status. The concept here is the use of graphics, pop-up windows and drop-down lists in a GUI to configure the functionality of pins on a programmable logical device. 15. The example used in this discussion of embodiments of the present invention is a programmable microcontroller.

Figure 6:
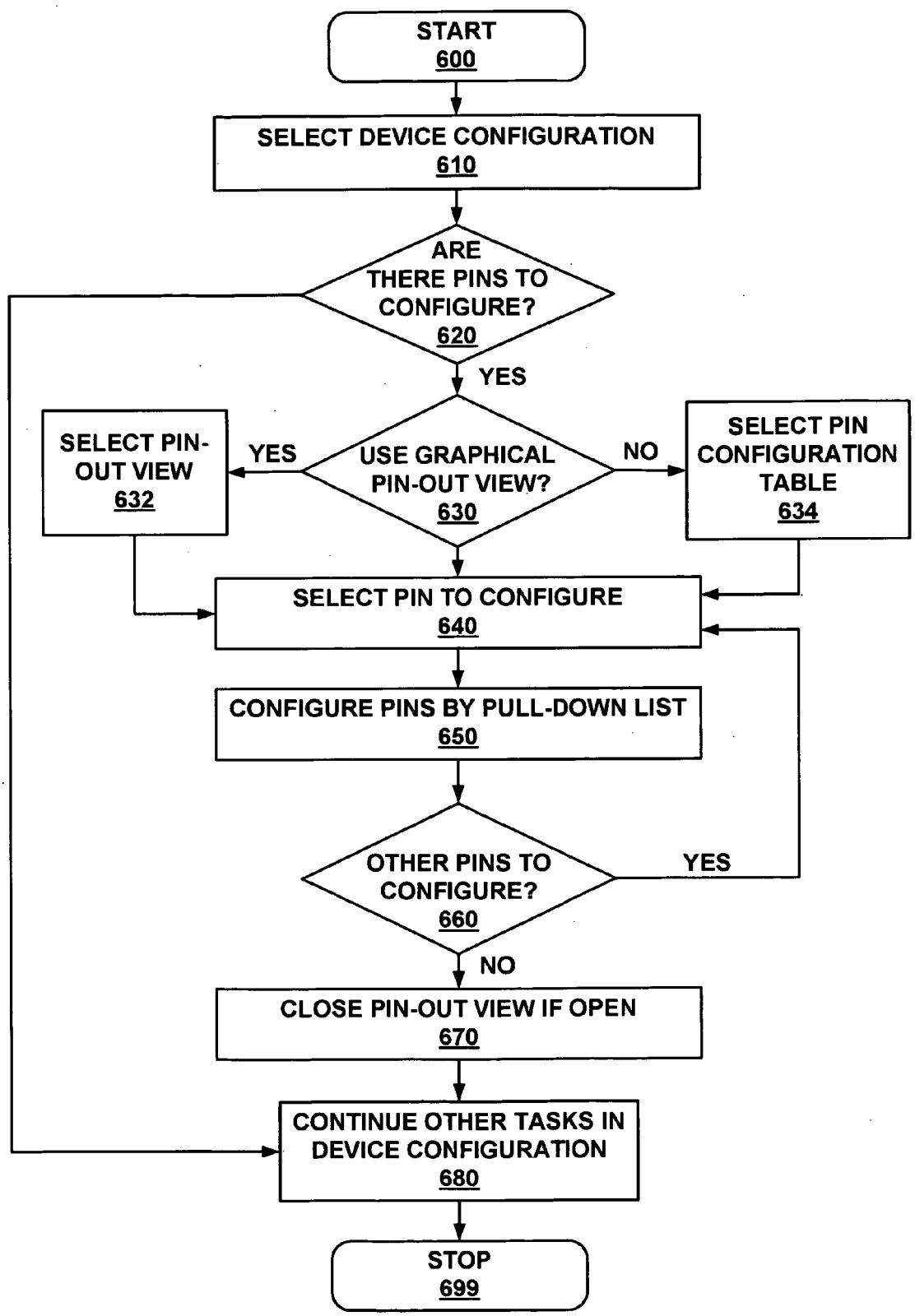
FIG. 6 illustrates a pin configuration method, in flowchart form, in accordance with one embodiment of the present invention.

The method of configuration is illustrated in block flow diagram form in FIG. 6. Process 600 starts when device configuration is selected, 610. If there are pins to configure in particular device at hand, 620, the user can then elect at 630 whether to use the graphic pin-out display, 632, or select the pin configuration table, 634. A pin to be configured is selected from either view at 640 and is configured at 650 by use of the appropriate pull-down list.

When the pin configuration is completed, 660, the pin-out view can be closed and other tasks in the device configuration attended to at 680. The configuration is complete, the process can be stopped at 699.

It is important to note that it is immaterial, as far as pin configuration is concerned, whether the user employs either the pin-out view or pin configuration table. The process of pin configuration in both cases involves changing values in a device configuration list that can be, ultimately, used to change values in registers resident in the device being configured. There can be at least three register values each for configuration of pin type and drive type. By using the user interface, the user need not be concerned with remembering register values or other parameters for pin configuration. Furthermore, the user has no need to be concerned with the means of actually implanting the values in the registers.

It is also important to note that, whether using the pin-out view or the pin configuration table, when a pin is selected, a pop-up window can appear that, as discussed above, presents options to the user. The selection set option first appears, as in window 400 in FIG. 4, showing pin and port number and offering the selection of either pin type or drive type. Selecting either option can cause the appearance of the selection set associated with the option selected. A port type selection set such as that offered in window 401 of FIG. 4 could appear if port type were selected. A drive type selection set such as in window 402 of FIG. 4 could appear if drive type were selected. The salient point, in this embodiment of the present invention, is that a pop-up window with a drop-down list can appear to supply the available options so that a user is not required to remember everything about every part of a device being configured. This embodiment of the present invention, enabled here as an aid to configuration of a programmable device, uses and enhances the user-friendliness inherent in a GUI.

There is an additional feature of the popup windows illustrated at 400, 401 and 402 that aids the user's convenience. If no selection is made from a window, mouse clicking anywhere outside the window can result in its disappearance. No specific closure or cancellation button is required to be selected.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

We claim:

1. In a computer system, a method for configuring input/output connections in a PSOC (programmable system-on-a-chip) device, comprising:
   displaying a graphical user interface enabled for said configuring of said PSOC device;
   selecting a configuration presentation from said graphical user interface;
   selecting an input/output connection from said programmable logical device for configuration, wherein said input/output connection comprises a pin for said PSOC device; and
   selecting options for said configuring of said input/output connections from a selection set presented in said graphical user interface.

2. A method as described in claim 1, wherein said graphical user interface is tailored to a specific PSOC device and implemented using a programming device.

3. A method as described in claim 1, wherein said PSOC device is a programmable microcontroller device.

4. A method as described in claim 1, wherein said configuration presentation is graphical presentation of a representation of said PSOC device.

5. A method as described in claim 1, wherein said configuration presentation is tabular presentation.

6. A method as described in claim 1, wherein said selecting of an input/output connection comprises mouse-clicking a graphical representation of said input/output connection.

7. A method as described in claim 1, wherein said selecting of an input/output connection comprises mouse-clicking a cell of a tabular representation of said input/output connection.

8. A method as described in claim 1, wherein said selecting of options comprises mouse-clicking a selection from a pop-up window.

9. A method as described in claim 8, wherein said options are presented in a drop-down list.

10. A system for configuring input/output connections in a PSOC (programmable system-on-a-chip) device, comprising:
    a computing device;
    a graphical display device communicatively coupled with said computing device;
    a graphical user interface implemented within said computing device and presented in said graphical display device;
    a graphical cursor control device communicatively coupled with said computing device and enabled to input commands to said computing device through said graphical user interface; and
    a PSOC device electronically and communicatively coupled with said computing device, wherein selecting specific points with said graphical cursor control device on said graphical user interface results in input/output pin configuration data being generated for said input/output pin of said PSOC device.

11. A system as described in claim 10, wherein said specific points relate to integrated circuit input/output pins.

12. A system as described in claim 10, wherein said computing device is a personal computer.

13. A system as described in claim 10, wherein said graphical user interface presents configuration options pertinent to said input/output connections.

14. A system as described in claim 13, wherein said configuration options pertinent to said input/output connections presented in said graphical user interface are presented in pop-up windows.

15. A system as described in claim 13, wherein said configuration options pertinent to said input/output connections presented in said graphical user interface are presented in drop-down lists.

16. A system as described in claim 10, wherein said PSOC device is a programmable microcontroller device.

17. A graphical user interface for aiding the configuration of a PSOC (programmable system-on-a-chip) device, comprising:
    a device configuration window;
    a user-selectable pin-out window in said device configuration window;
    a pin configuration parameters table;
    a pop-up window, comprising selection options pertinent to the configuration of input/output connections; and
    a drop-down list comprising selection options pertinent to the configuration of said input/output connections wherein said graphical user interface is enabled to accept user input commands in the process of configuring said PSOC device, and wherein said input/output connections comprise pins of said PSOC device.

18. A graphical user interface as described in claim 17, wherein said graphical user interface is enabled to accept mouse-click commands as said user input commands.

19. A graphical user interface as described in claim 17, wherein said device configuration window is specifically tailored to program input/output pin configurations on a programmable microcontroller device.

20. A graphical user interface as described in claim 17, wherein said user-selectable pin-out window is graphically configured in the form of said PSOC device and implemented using a programming device.

21. A graphical user interface as described in claim 17, wherein said pop-up window comprises selection options pertinent to the configuration of input/output pins of said programmable logic device.

22. A graphical user interface as described in claim 21, wherein said pop-up window is enabled to appear when an input/output pin is selected by a mouse-click in said pin-out window.

23. A graphical user interface as described in claim 21, wherein said selection options in said pop-up window are selectable by a mouse-click.

24. A graphical user interface as described in claim 17, wherein said pin configuration parameters table comprises selection options pertinent to the configuration of said input/output connections.

25. A graphical user interface as described in claim 17, wherein said drop-down list is enabled to appear when a tabular listing associated with said input/output connections is selected by mouse-click in said pin configuration parameters table.

26. A graphical user interface as described in claim 17, wherein said drop-down list comprises selection options pertinent to the configuration of said input/output connections.

27. A graphical user interface as described in claim 17, wherein said pop-up window disappears from said graphical user interface when a mouse-click is made outside said pop-up window.

28. In a computer system, a tool for programming a PSOC (programmable system-on-a-chip) integrated circuit comprising:

a graphical representation of said integrated circuit displayed on a display screen, said graphical representation comprising input/output pins; and a window displayed in response to a selection of an input/output pin, wherein said window comprises a list of selectable attributes for assigning said input/output pin and wherein both pin type and drive type can be assigned to said input/output pin from said list of selectable attributes.

29. A tool as described in claim 28 further comprising a cursor control device for providing said selection of said input/output pin.

30. A tool as described in claim 29 wherein said cursor control device is also for providing a selection of said list of selectable attributes.

31. A tool as described in claim 29 wherein said window automatically disappears if said cursor control device makes a selection outside of said window.

32. A tool as described in claim 28 further comprising a tabular display of information in cells comprising, for each of said input/output pins, a column for pin name, a column for pin type and a column for drive type.

33. A tool as described in claim 32 wherein said window is also displayed in response to a selection of a cell of said tabular display of information.

* * * * *